Feb. 12, 1963 W. B. TEMPLETON ETAL 3,077,304

ELECTRICAL APPARATUS FOR MULTIPLE FACTOR STORAGE

Filed Jan. 11, 1960 5 Sheets-Sheet 1

INVENTORS.
WILLIAM B. TEMPLETON.
BY MARTIN SIEGEL.

Harry R. Dumont
ATTORNEY.

INVENTORS.
WILLIAM B. TEMPLETON.
MARTIN SIEGEL.
BY Harry R. Dumont
ATTORNEY.

Feb. 12, 1963 W. B. TEMPLETON ETAL 3,077,304

ELECTRICAL APPARATUS FOR MULTIPLE FACTOR STORAGE

Filed Jan. 11, 1960 5 Sheets-Sheet 3

INVENTORS.
WILLIAM B. TEMPLETON.
MARTIN SIEGEL.
BY Harry R. Dumont
ATTORNEY.

INVENTORS.
WILLIAM B. TEMPLETON.
MARTIN SIEGEL.
BY
Harry R. Dumont
ATTORNEY.

INVENTORS.
WILLIAM B. TEMPLETON.
MARTIN SIEGEL.
BY Harry R. Dumont
ATTORNEY.

United States Patent Office 3,077,304
Patented Feb. 12, 1963

3,077,304
ELECTRICAL APPARATUS FOR MULTIPLE FACTOR STORAGE

William B. Templeton, Northville, and Martin Siegel, Livonia, Mich., assignors to Burroughs Corporation, Detroit, Mich., a corporation of Michigan
Filed Jan. 11, 1960, Ser. No. 1,789
9 Claims. (Cl. 235—160)

The present invention relates generally to multiplying systems and apparatus and more particularly to an electrical apparatus providing multiple factor storage therein.

It is an object of this invention to provide a multiple factor storage for an electro-mechanical multiplier or calculating machine.

It is an additional object of this invention to provide a selectively variable multiple factor storage system for an electro-mechanical multiplier.

It is a further object to provide a variable multiple factor storage system for an electro-mechanical multiplier operable by carriage controls.

It is still a further object to provide a variable multiple factor storage system for an electro-mechanical multiplier operable by carriage controls in conjunction with a decimal shift mechanism.

Still another object is to make a plurality of fixed factors available from a single register order of a calculating machine instead of allocating a different register for each separate factor.

In accordance with the foregoing objects and first briefly described, the invention as embodied in an electro-mechanical multiplier machine comprises a selectively controlled electrical apparatus which operates to split or group a plurality of storage elements of an operand storage unit into which a plurality of digits were previously entered from a storage register, into separate groupings each providing a different fixed factor for subsequent use in a calculating type computing machine. The electrical apparatus includes a multiple position switch and coupling network which couples each selected group of operand storage elements providing a selected factor with the column shifter unit for processing into partial products which are then fed into the proper columns of the product accumulator unit to produce a final product. The control of the selection is exercised by a carriage controlled decimal shift mechanism. An additional control operable at the will of the operator is provided to vary the split between the storage elements of the operand storage unit to control the size of the several factors.

The present invention will be more clearly understood from the following detailed description in conjunction with the attached drawings, wherein.

Figure 1:
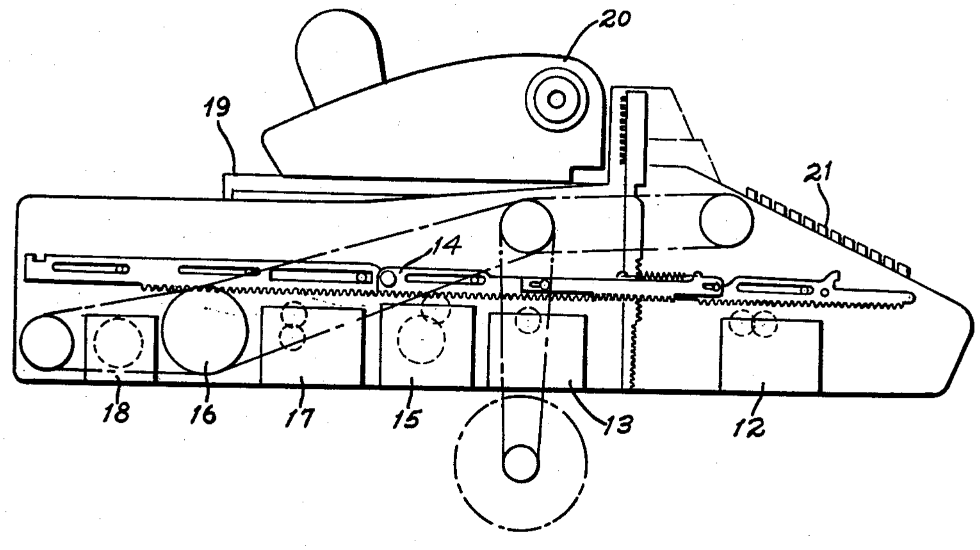
FIG. 1 is a diagram of the multiplying machine showing the general location and organization of its components.

In FIG. 1 is shown an accounting machine of the general type disclosed in U.S. Patent 2,629,545 issued to T. M. Butler on February 29, 1953. The conversion of this machine into an electro-mechanical multiplying machine which operates by the right and left hand components method is described and claimed in Bradshaw et al. application Serial Number 724,985 filed March 31, 1958, now U.S. Patent No. 3,002,689. Other portions of the multiplying machine of interest in connection with the present invention are disclosed in Hanstein et al. application Serial Number 693,779, "Accumulator for Accounting Machine" filed October 31, 1957 and Jones application Serial Number 739,567, "Rotary Read-Out and Storage Device" filed June 3, 1958, now U.S. Patent No. 2,955,758, the above mentioned applications and patent all being of common ownership herewith.

Included in the multiplying machine are the registers 12 and 13 of the transversely arrayed pinion type well known in the art and described in the aforementioned Butler patent. A differentially positionable data rack 14, one of a plurality of transversely arranged racks, is vertically aligned with a pinion in each of the registers 12 and 13 and engageable therewith. An operand storage unit 15 is shown rearwardly of register 13. Also shown are pulse generator 16, product accumulator 17, a component or multiplying unit 18, control panel 19, carriage 20, and keyboard 21.

Figure 2:
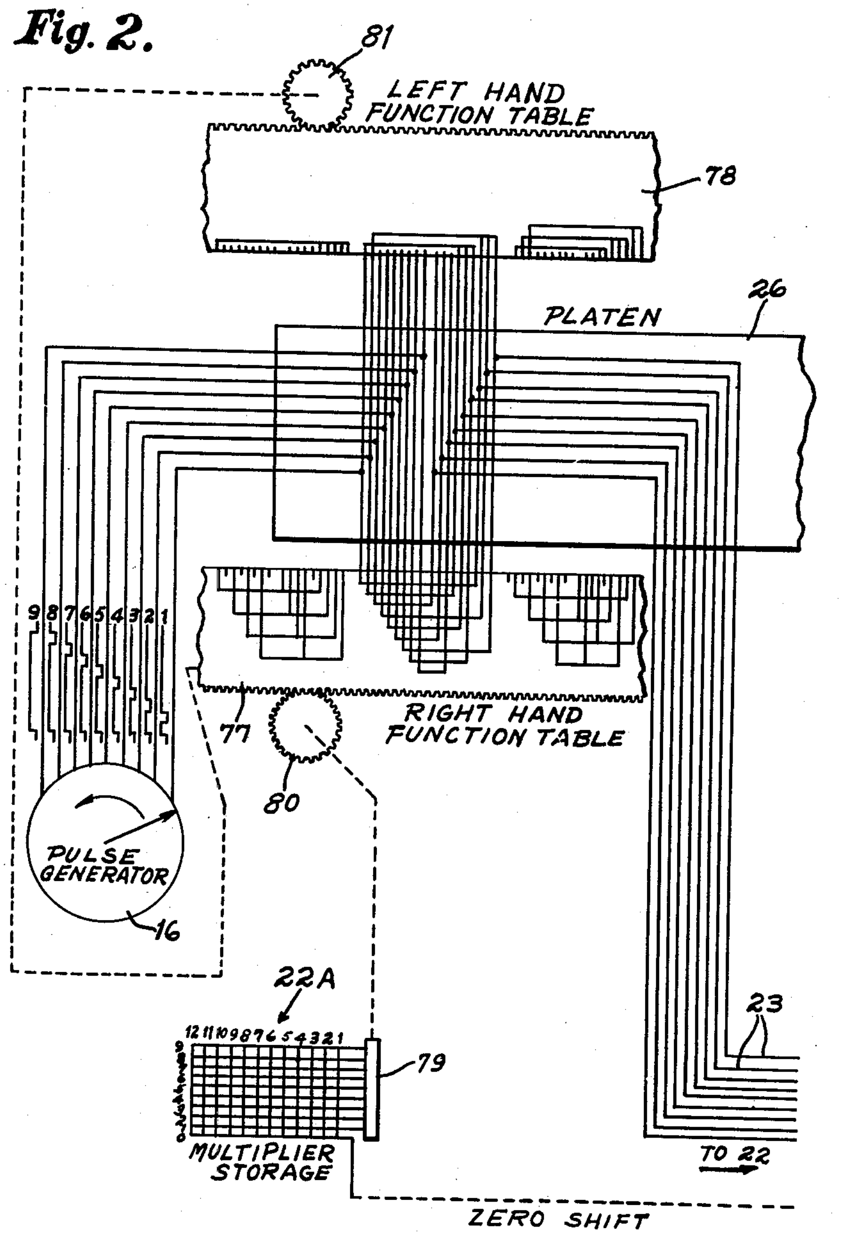
FIGS. 2 and 2A are schematics showing the pulse route from the pulse generator to the product accumulator.

FIG. 2 shows the circuitry whereby electrical pulses originating from the pulse generator 16 are routed through the components unit including contactors on the left end of a platen 26 between right and left hand function tables 77 and 78 herein embodied rectilinearly but shown in the aforementioned Bradshaw application as printed circuit or multiple lead carrying discs. The pulses generated by pulse generator 16 increase in time length progressively from "1" to "9" as shown. They are routed from the platen 26 through the right hand function table 77, left hand function table 78, and thence through the platen 26 through data leads 23 to the multiplicand storage unit 22 in FIG. 2A. The right hand function table position selector 79 operates by means of element 80 to position the right hand function table 77 which positions the left hand function table 78 in correct relationship to the right hand function table by means of follow-up element 81.

Figure 2A:
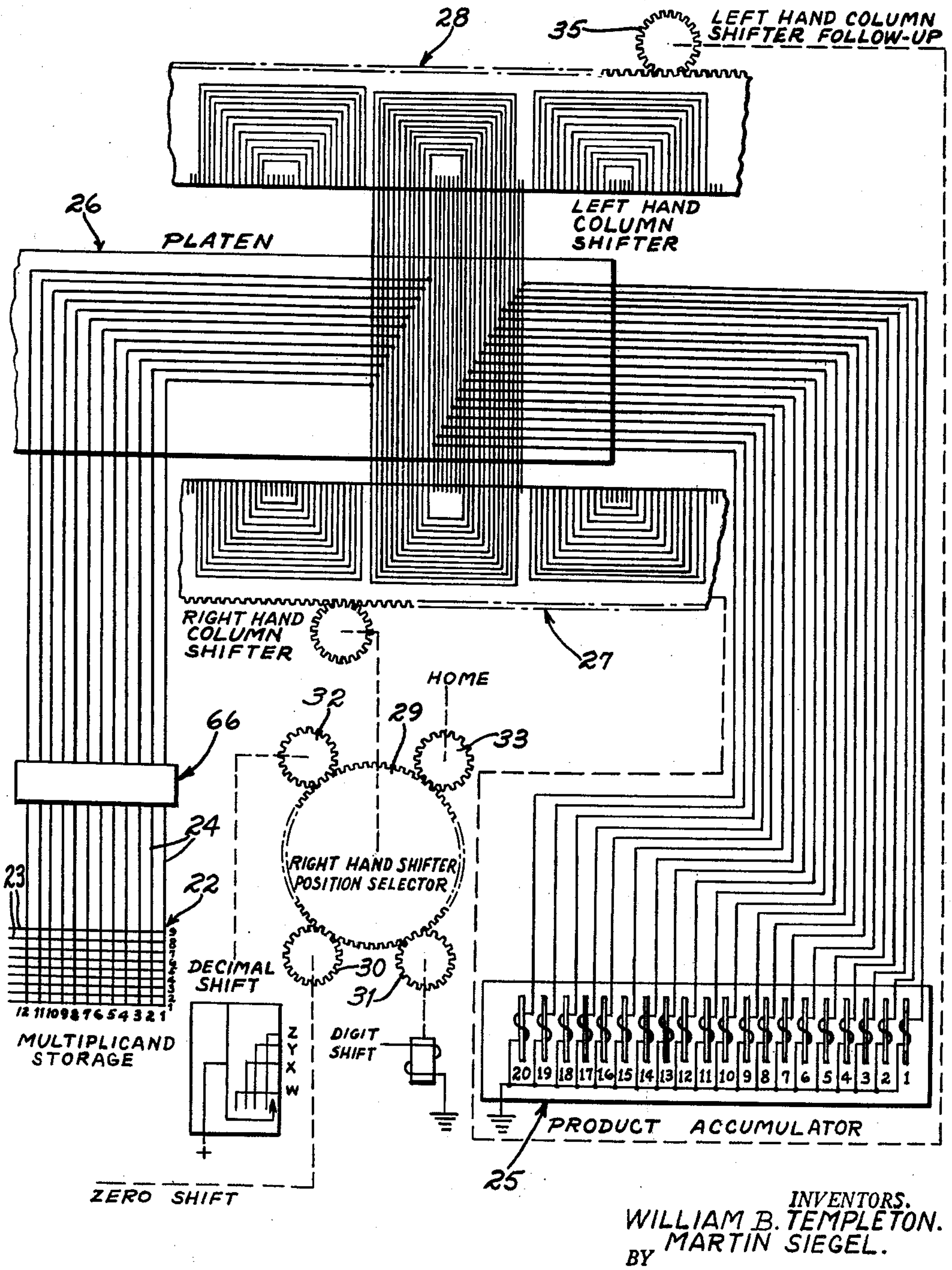

FIG. 2A shows the circuitry whereby electrical pulses are routed from the multiplicand storage unit 22 in the operand storage unit 15. Nine data leads 23, each coupled to the left end of the platen 26 as shown in FIG. 2 representing a digit value from one to nine, intersect each of twelve rows of parallel common conductors 24 for columns to be selected in the product accumulator. For transferring selected pulses through the multiplicand storage unit 22 for delivery to the product accumulator 25, that portion of the shiftable platen 26 between the schematic showing of the printed circuits on right and left hand column shifters 27 and 28 of the components unit has a series of double ended contactors projecting from opposite sides thereof.

The group of contacts carried on the right hand end of the platen between right and left hand column shifters 27 and 28 serve to bridge circuits through the right and left hand column shifters to the product accumulator 25 when shifted into contact therewith, the product accumulator forming the subject matter of the aforementioned Hanstein et al. application. The platen 26 is shiftable from a neutral non-contact position to engage one pair of discs at one end for a half cycle, return to the neutral position, shift to engage the other pair of discs for another half cycle, and then return to the neutral position preparatory for another multiplier selection as described in the aforementioned Bradshaw application. These column shifter devices are illustrated in FIGS. 20 through 23 of the aforementioned Bradshaw application. While the left and right hand column shifters are rectilinearly shown herein, they are embodied as multiple lead, printed circuit carrying disc members rotatably mounted and clutch controlled. Their function is to locate digits other than zero in the multiplier storage unit *22a* and to channel the electrical pulses representative of partial products into the proper accumulator columns. The right hand column shifter 27 is operative to route the right hand components of the partial product through the platen 26 to the proper accumulator columns. The left hand column shifter performs the same function for the left hand components of the partial products. As shown in FIG. 2, the contactors on the right end of the platen correspond to the twelve column commons 24 of the multiplicand storage unit and are connected respectively to commons "1" to "12" of the multiplicand storage unit and serve as inputs of the partial products generated to the product accumulator 25 and function for proper registration with the twenty accumulator columns according to the decimal setting as controlled by the decimal shift mechanism to be shown hereafter in connection with FIG. 3. In the absence of a decimal shift program the orientation of the leads on right and left hand shifters 27 and 28 are aligned by steps into the proper columnar location by the diagrammatically illustrated control element zero shift 30, digit shift 31, decimal shift 32, and homing is accomplished by element 33. The right hand shifter position selector is indicated by numeral 29. The manner of their control and operation is described in the aforementioned Bradshaw application. After the right hand shifter 27 has been stepped into position, the left hand shifter 28 is stepped into a column position one column ahead of the digit column position taken by the right hand shifter 27 through left hand shifter follow-up 35.

Figure 3:
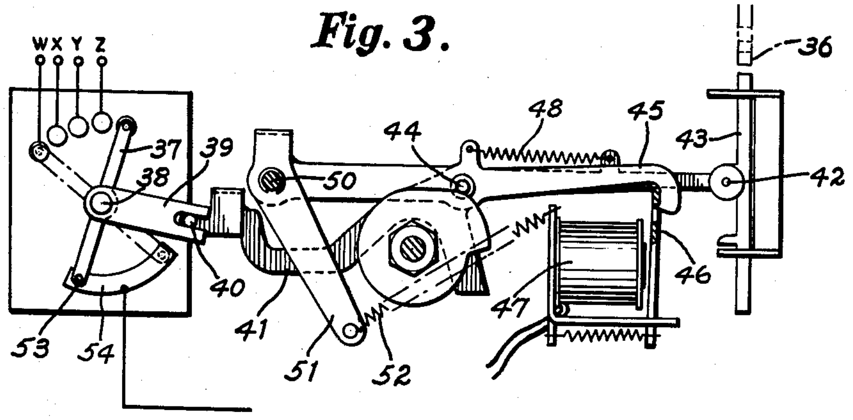
FIG. 3 is a fragmentary view of the decimal shift mechanism of the multiplying machine.

FIG. 3 shows a fragmentary view of the differentially positionable switching means herein shown as a decimal shift mechanism as operated by control pins 36 of different lengths in the carriage control panel 19 and more fully described in U.S. Patent 2,981,467. The rotary decimal switch arm 37 terminates in a wiper contactor to ride successively over a row of four contacts acting as voltage outputs corresponding respectively to the decimal shift contactors W, X, Y and Z, such row of contacts being respectively for 2, 5, 7 and 8 decimal shifts as also shown in connection with FIG. 2. The switch arm 37 is pivoted at its center on shaft 38 and has an extended arm 39 having a bifurcated end straddling a pin 40 by means of which the switch arm 37 is selectively positioned for the desired decimal shift. The pin 40 projects laterally from one end of a control lever 41 the opposite and of which is pivotally attached at 42 to a tappet 43. The program pin 36 by its length determines the travel of the tappet 43 whereby the decimal setting of the switch arm 37 is determined. The control lever 41 has a pivot 44 mounting a latch 45 with a hooked end for latching over an apertured clapper 46 of a solenoid 47. The latch 5 is biased by a coil spring 48 stretched between it and the control lever 41. The latch 45 is the long arm of a bell crank pivoted on a fixed pivot 50 with its short arm 51 biased for counterclockwise movement by a coil spring 52 stretched between it and a fixed point. The biasing action provided thereby is not effective until the latch 45 has been released by the energizing of solenoid 47. Arm 37 is extended to terminate in a wiper contactor 53 riding on arcuate segment 54.

Figures 4, 5:
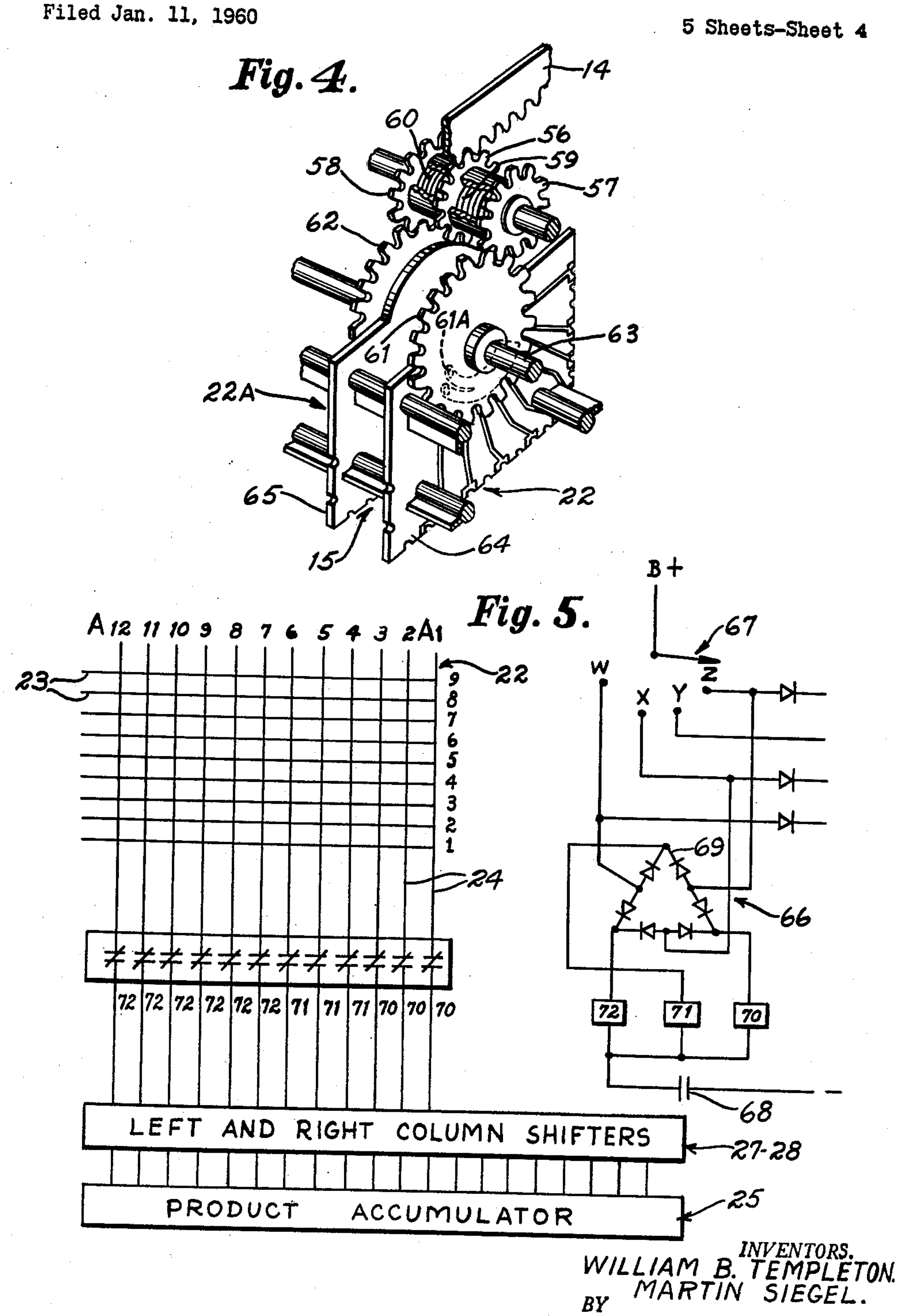
FIG. 4 is a perspective view of the operand storage unit.
FIG. 5 is a schematic of the circuit controlling the multiple factor storage and selection.

FIG. 4 shows a portion of the operand storage unit 15 as also indicated in FIG. 1. The multiplicand storage units 22 and multiplier storage units 22A, a plurality of which are included in the operand storage unit are similarly constructed. It is noted that the schematic representation of the multiplicand storage unit is hereinbefore illustrated in FIG. 2A by numeral 22. The general physical and electrical organization is that of the dual rotary read-out device as described and claimed in the aforementioned Jones application now U.S. Patent No. 2,955,758. The combination utilized is a pinion gear 56 which is journalled above contact gears 61 and 62 and is constantly in engagement with a data rack 14. Carriage operated pin control in the control panel 19 will cause an amount to be extended and entered into the multiplicand storage unit 22 or the multiplier storage unit 22A from one of the registers 12, 13. Journalled on a common shaft with pinion 56 are pinions 57 and 58 which are connected thereto for rotating movement by springs 59 and 60. Contact gears 61 and 62 are journalled on a common shaft 63 and each carries a wiper contact engaging printed circuit boards 64 and 65 respectively. An each data rack 14 is driven forward during a cycle of operation of the accounting machine, pinion 56 through springs 59 and 60 will turn its associated pinions 57 and 58 thus rotating contact gears 61 and 62 engaged therewith, and the wiper contacts 61A and 62A, only one of which is shown, on the contact gears 61 and 62 respectively will index circuits representing the digital value of the multiplier and multiplicand as previously entered through the keyboard 21 or as previously stored in register 12 or 13 of the accounting machine. These amounts are then retained in respective ones of the storage units 22, 22A by independently operable detent devices, which are shown in the aforementioned Jones application cooperating with gears 61 and 62 and are cam operated between a release and detent position from the timing shaft of the multiplier machine during a data entry cycle in selected carriage positions thereof.

FIG. 5 shows the control here shown as electrical control circuit 66 which makes factor selection from the amount stored in the printed circuit boards in the multiplicand storage unit 22 in the manner described in connection with FIG. 4. As shown by schematic representation, there are twelve leads 24 each extending from a different one of the common terminals of twelve individual multiplicand storage, electrical read-out units each of which in turn is mechanically associated with a different data rack 14 and each of the leads 24 is adapted to be connected selectively to any one of the nine numeric data leads 23 for digits stored from one to nine in digital value in individual ones of the storage units. Each of the 12 leads is connectible to the leads of the right and left hand column shifters 27 and 28 through the platen 26 as shown in FIG. 2. From the pulse generator 16, nine pulse outputs are fed through the component unit 18, leads 23, and following units as illustrated in FIG. 2, and these pulses representing partial products are then diverted for accumulation in the product accumulator 25 as shown and described in the aforementioned Hanstein et al. application. Briefly described, storage in the product accumulator 25 is accomplished by action of solenoids which set pinions into positions representative of the digital values of the partial products.

The control circuit is designated as a whole by the numeral 66. A multiple position switch 67 has four positions W, X, Y, and Z corresponding in designation to the 2—5—7—8 decimal shift positions as shown by W, X, Y, and Z in FIGS. 2 and 3. In the embodiment shown for the present invention, storage is provided for handling three factors having three digits in the first, three digits in the second, and six digits in the third. Selection of any of these factors may be accomplished by means of carriage controlled pin projections in the control panel 19 as shown in FIG. 3. The setting of the movable contact for multi-position switch 67 is initiated and controlled in the manner as shown for the decimal shift mechanism in connection with FIG. 3. A carriage controlled non-sensing switch 68 is normally open until a selection of one of the factors is programmed. Leads from W, X, Y, and Z contacts are coupled to a delta-connected diode network 69 from which individual leads connect to factor relays 70, 71, and 72. A normally closed relay-operated switch is serially connected in each lead 24 running from the multiplicand storage unit 22 to the right and left hand partial products shifter 27 and 28. Each of these switches is numbered 70, 71, or 72 in accordance with the factor relay which controls its opening.

Figure 6:
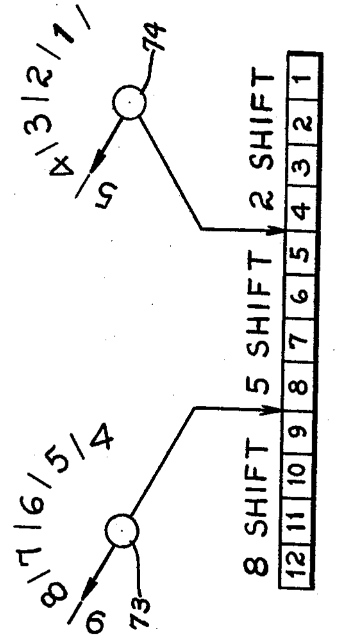
FIG. 6 is a diagrammatic view of the manual selection control.

FIG. 6 illustrates the manual control for an alternate embodiment of the invention. A pair of manual selectors 73 and 74 is provided which selectors are positionable between various digit columnar positions from one through nine. The selectors are shown in positions indicative of a 2—5—8 shift wherein three factors of four digits each are provided.

Figure 7:
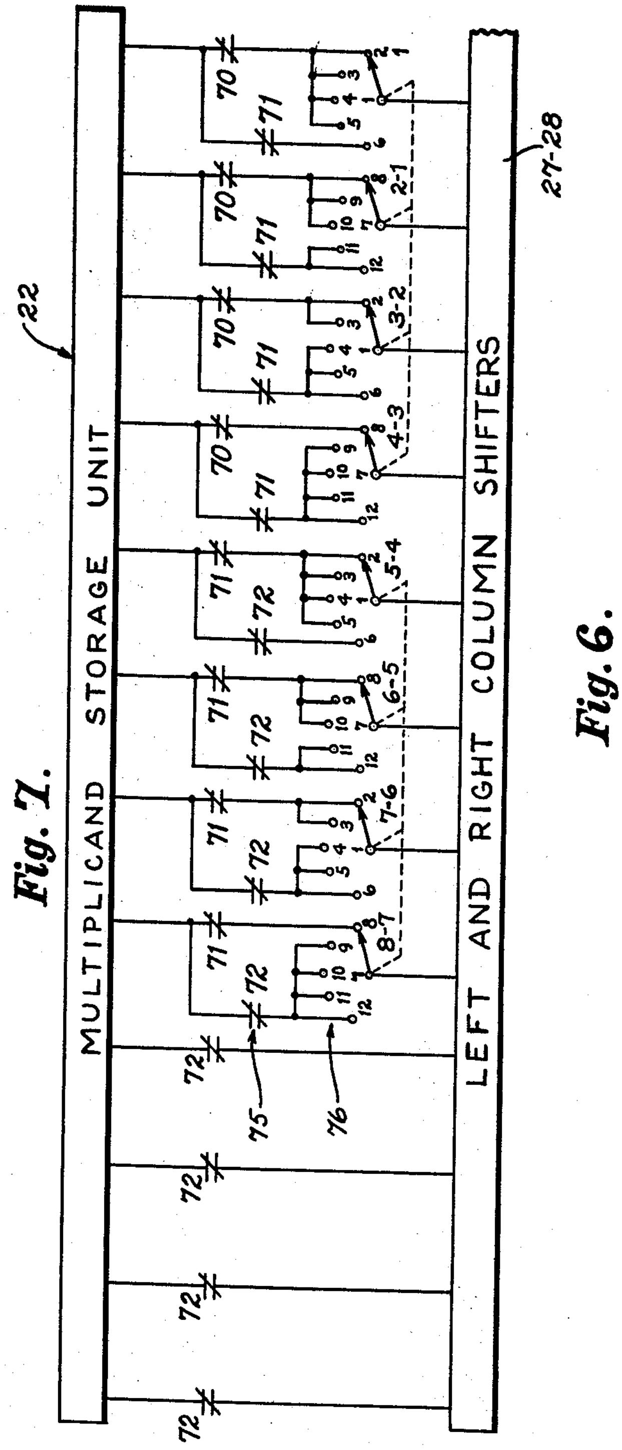
FIG. 7 is a schematic showing the manual selection control operation.

FIG. 7 shows the circuit actuated by the positioning of manual selectors 73 and 74. A group of switches numbered 72 and 71 shown in horizontal line 75 are connected in parallel with the existing switches as previously shown in FIG. 5. Each of the switches in horizontal line 75 is numbered in accordance with the relay 70, 71 or 72 as shown in FIG. 5 which will effect its opening. An additional group of switches are provided in horizontal line 76 whose positions are controlled by the manual selectors 73 and 74 in FIG. 6. Each of these switches is numbered in accordance with digit columnar position 1, 2—1, 3—2, and 4—3 being controlled by selector 74 and 5—4, 6—5, 7—6, and 8—7 being controlled by selector 73.

*Description of Operation*

Each register in the multiplying machine such as register 12 and 13 is capable of storing a fixed factor comprising 12 digits. In many cases it is not necessary for these fixed factors to be of such large digit length. It is sometimes desirable to divide or split the individual registers into a plurality of fixed factors of lesser digits length. This is accomplished by employing the present invention. When fixed factors are stored in a register, they are first extended into the operand storage unit 15 as a multiplier or multiplicand. The embodiment of the present invention will be described in relation to selective control of the multiplicand since it commonly contains a larger number of digits than the multiplier. It should be considered that the invention can be applied equally well to the multiplier storage unit especially if both quantities were short in regard to digit length. The register in which the single or multiple multiplicand factor is stored is first extended by a sub-totaling operation into the multiplicand storage unit 22 as best shown in FIG. 4. The operation may be briefly described as one wherein a sub-total function control key in keyboard 21 is depressed or a control pin in the carriage operated control panel 19 is effective to initiate a cycle of sub-total operation of the machine. During this cycle the data racks 14 mesh with the pinions of the register 12 or 13 and move forwardly in the machine until they are limited in their travel by the large tooth in the register pinions. This results in the racks being arrested in their movement in accordance with the digital value of the pinion position which is representative of the amount previously stored in the register. As best shown in FIG. 4, during their forward movement, each rack rotates pinion 56 to enter the value of the digit stored in the register pinion into the multiplicand storage unit 22 by means of spring 59 turning contact gear 61 so that its wiper contact is aligned with one of the printed circuit leads indicative of a digital amount from one to nine. When this has been done simultaneously in all 12 rotary multiplicand storage units 22, there is available a factor which may include as many as 12 digits. While complete flexibility of the number of factors and their digital number is obtainable, the present embodiment as operated in conjunction with a carriage controlled decimal shift provides for three factors, the first having three digits, the second having three digits, and the third having six digits. In order to not detract from present register use to provide for storage of a single 12 digit factor, a non-sensing switch 68 remains open until a selection of one of a plurality of factors stored in a single register has been programmed such as by a control pin in the control panel 19. When this switch is closed, a factor selection is then possible by operation of the decimal shift mechanism as shown in FIG. 3. If a 2 shift is programmed the length of a pin 36 in the carriage will permit movement of sensing tappet 43 to its uppermost position. After carriage control energizing of solenoid 47 and release of latch 45, the spring 52 triggers the lever assembly so that the pivot 44 moves counterclockwise to switch contact position W to select a "2" decimal shift. The movable arm of multiple position switch 67 is moved to its "W" position by the decimal shift mechanism as hereinabove described.

With reference to FIG. 5 when position "W" is selected, current passes through diode network 69 to energize relays 71 and 72 and thereby open the corresponding nine normally closed switches connected in leads 24 and designated by numerals 71 and 72. Thus the stored digits in the three digit factor as transmitted by switches 70 may be utilized in a multiplication process and will be transmitted by electrical pulses originating from the pulse generator 16 and utilized in the process of generating partial products in the subsequent processing by the right and left hand shifters 27, 28, and diverted to the proper columns of the product accumulator 25. If an "X" or "5 Shift" position is selected, current will pass through diode network 69 to energize relays 70 and 72, thereby opening the nine normally closed switches numbered 70 and 72, and thence making the remaining three digit factor available as transmitted by switches 71 for a multiplication process. In a like manner if a "Z" or "8 Shift" is selected, relays 70 and 71 will be energized and the six digit factor as transmitted by switches numbered 72 will be available for a multiplication process. In the present embodiment of the invention, as is evident from FIG. 5, selection of a "Y" or "7 Shift" position on switch 67 will not operate to select a factor for multiplication. It should also be noted that failure to close switch 68 will disable any multiple factor control or selection by control circuit 66. Any factor of 12 digits or less which has been extended from a register into the multiplicand storage unit 22 can be used as a single factor in the multiplication process when switch 68 has been programmed open.

With reference to FIGS. 6 and 7, an alternate embodiment is illustrated which provides a manually settable means for predetermining the digits of the factors to be included in each group of factor digits. This permits complete flexibility of the factor selection control. If a "2" shift is programmed, the operator can manually set selector 74 in any position between 1 and 5 as shown in FIG. 6 to conform with the number of digits required for the factor. For example, if a factor requires three digits only, the selector 74 is positioned between 4 and 3. As best shown in FIG. 7, switches 4—3, 3—2, 2—1, and 1 will all be stepped counterclockwise one step from their normal positions. Thus the lead from the multiplicand storage unit 22 controlled by switch 4—3 will be transferred from the control of relay 70 to that of relay 71. The 2 shift programmed will thus utilize a factor of three digits only leaving an additional digit available for the factor to be utilized by a 5 shift. In a like manner if the factor to be used in connection with an 8 shift is to be increased to six instead of four digits the selector 73 in FIG. 6 will be moved clockwise to a position between 6 and 7. As shown in FIG. 7, switches 8—7, 7—6, 6—5, and 5—4 will be displaced counterclockwise two positions so that contacts in the leads from the multiplicand storage unit 22 controlled by switches 8—7 and 7—6 will be transferred from the control of relay 71 to that of relay 72. It can be seen that this modification of the invention permits selective varying of the number of digits between the plurality of stored factors.

The present invention may be utilized in any electro-mechanical multiplying machine or calculator having a plurality of registers in which factors or amounts may be stored preparatory to performance of subsequent multiplying operations. In a multiplying program for the machine in which several factors are to be multiplied, the entire capacity of a register is no longer required for storage of a single factor. The present invention permits selective splitting of one or more registers into a plurality of variable capacity storage units, each available for storage of an individual factor. This selection is accomplished without requiring physical or electrical adjuncts for the storage registers and in a manner which provides complete flexibility of the number of factors and their digital length.

What is claimed is:

1. In combination, a multiplying machine having a movable carriage, a multiplicand storage means including a plurality of denominationally ordered decimal storage, electrical read-out devices each of like construction and including a plurality of numeric data terminals and a common or column terminal connected to one of the data terminals in accordance with the numeric value of the decimal digit of that order of the multiplicand corresponding to that read-out device, and a multiplying unit including column shifter means having electrical terminals normally connected to the column terminals of said read-out devices, and a carriage controlled, full and partial multiplicand selector unit including selectively operable control elements connected between the column terminals of each of said multiplicand storage read-out devices and said column shifter means of said multiplier unit and affording a selection in different carriage positions of the multiplying machine of utilizing the entire multiplicand quantity in the multiplicand storage means with said multiplying unit in one of said carriage positions and different parts of the same multiplicand quantity stored in the same multiplicand storage means with said multiplying unit in different positions of said carriage.

2. In combination, a multiplying machine having a movable carriage, a multiplicand storage means including a plurality of denominationally ordered decimal storage, electrical read-out devices each of like construction and including a plurality of numeric data terminals and a common or column terminal connected to one of the data terminals in accordance with the numeric value of the decimal digit of that order of the multiplicand corresponding to that read-out device, and a multiplying unit including column shifter means having electrical terminals normally connected to the column terminals of said read-out devices, and a carriage controlled, full and partial multiplicand selector unit including selectively operable control elements connected between the column terminals of each of said multiplicand storage read-out devices and said column shifter means of said multiplier unit and affording a selection in different carriage positions of the multiplying machine of utilizing the entire multiplicand quantity in the multiplicand storage means with said multiplying unit in one of said carriage positions and different parts of the same multiplicand and quantity stored in the same multiplicand storage means with said multiplying unit in different positions of said carriage, said selector unit including a plurality of selectively operable control relays each corresponding to and controlling a different group of said multiplicand storage read-out devices and having a plurality of switch contacts each connected in circuit between the column terminal of a different one of the storage devices of the group of storage devices controlled thereby and said multiplying unit, and carriage position actuated switching means controlling operation of various ones of said control relays in different carriage positions.

3. The combination with an electro-mechanical multiplying machine having a movable carriage, a keyboard for indexing of a multiplier quantity and a multiplicand quantity in different positions of the carriage, storage and totalizer registers, a plurality of differentially positionable data racks cooperable with said keyboard and said registers, electro-mechanical multiplier storage means and multiplicand storage means selectively settable by and in accordance with the differential positions of said data racks in different positions of the carriage, each of said storage means including a plurality of denominationally ordered decimal storage, electrical read-out devices each of like construction and including a plurality of numeric data terminals and a common or column terminal connected to one of the data terminals in accordance with the numeric value of the decimal digit of that order of a stored quantity corresponding to that order of read-out device, and a partial product multiplying unit including left and right hand function tables having electrical terminals coupled to the numeric data terminals of said multiplier and multiplicand storage devices and a column shifter section having electrical input terminals normally connected to column terminals of said multiplicand storage read-out devices and electrical output terminals, and a product accumulator having electrical terminals connected to the electrical output terminals of the column shifter section of the multiplying unit and cooperable with the data racks to position the racks in accordance with the computed product of the multiplier and multiplicand quantities, of a carriage controlled, differentially operable, full and partial multiplicand selector unit including control elements connected in circuit between the column terminals of each of said multiplicand storage read-out devices and the input terminals of said column shifter section of said multiplier unit and affording a selection in different carriage positions of utilizing the entire multiplicand quantity stored in all of the read-out devices of the multiplicand storage means with said multiplying unit in one of said carriage positions and different parts of the multiplicand quantity stored in the same multiplicand storage means with said multiplying unit in different positions of said movable carriage.

4. The combination in accordance with claim 3 wherein said selector unit including a plurality of selectively operable control relays each corresponding to and controlling a different group of said multiplicand storage read-out devices and having a plurality of switch contacts each connected in circuit between the column terminal of a different one of the storage devices of the group of storage devices controlled thereby and said multiplying unit and carriage position actuated switching means controlling operation of various ones of said control relays in different carriage positions.

5. The combination with a multiplying machine having a movable carriage, a multiplicand storage means including a plurality of denominationally ordered decimal storage, electrical read-out devices each of like construction and including a plurality of numeric data terminals and a common or column terminal connected to one of the data terminals in accordance with the numeric value of the decimal digit of that order of the multiplicand corresponding to that read-out device, and a multiplying unit including column shifter means having electrical terminals normally connected to the column terminals of said read-out devices, of a carriage controlled, differentially operable, full and partial multiplicand selector unit including control elements connected in circuit between the column terminal of each of said read-out devices and the column shifter means of said multiplier unit and affording a selection in different carriage positions of the multiplying machine of utilizing the entire multiplicand quantity in the multiplicand storage means with said multiplying unit in one of said carriage positions and different parts of the multiplicand quantity stored in the same multiplicand storage means with said multiplying unit in different positions of said carriage, said selector unit comprising a plurality of selectively operable control relays each corresponding to and controlling a different group of said multiplicand storage devices and having a plurality of normally closed switch contacts each connected in circuit betwen the column terminal of a different one of the storage devices of the group of the storage devices controlled thereby and the terminals of the multiplier unit column shifter means, and carriage position operated switching means actuable to complete energizing circuits to different ones of said control relays in different positions of said carriage.

6. The combination with a multiplying machine having a movable carriage, a multiplicand storage means including a plurality of denominationally ordered decimal storage, electrical read-out devices each of like construction and including a plurality of numeric data terminals and a common or column terminal connected to one of the data terminals in accordance with the numeric value of the decimal digit of that order of the multiplicand corresponding to that read-out device and a multiplying unit including column shifter means having electrical terminals normally connected to the column terminals of said read out devices, of a carriage controlled, full and partial multiplicand selector unit including control elements connected between each of said read-out devices and said multiplier unit and affording a selection in different carriage positions of utilizing the entire multiplicand quantity in the multiplicand storage means with said multiplying unit in one of said carriage positions and different parts of the quantity stored in the same multiplicand storage means with said multiplying unit in different positions of said carriage, and manually presettable switching means connected in the column terminal circuits of a group of successive denominationally ordered storage devices for varying the denominational capacity of a part of the stored multiplicand quantity to be selected in a partial multiplicand selector position of the machine carriage.

7. The combination with a multiplying machine having a movable carriage, a multiplicand storage means including a plurality of denominationally ordered, decimal, electrical read-out devices each of like construction and including a plurality of numeric data terminals and a common or column terminal connected to one of the data terminals in accordance with the numeric value of the decimal digit of that order of the multiplicand corresponding to that read-out device, and a multiplying unit including column shifter means having electrical terminals adapted to be connected to the column terminals of said read-out devices, of a carriage controlled, differentially operable, full and partial multiplicand selector unit including selectively operable control elements connected in circuit between the column terminals of each of said multiplicand storage read-out devices and the column shifter terminals of said multiplier unit and affording a selection in different carriage positions of the multiplying machine utilizing the entire multiplicand quantity in the multiplicand storage means with said multiplying unit in one of said carriage positions and different parts of the some multiplicand quantity stored in the same multiplicand storage means with said multiplying unit in different positions of said carriage, and manually presettable, multiple position, plural level switching means each connected in the column terminal circuits of a group of successive denominationally ordered storage devices for varying the denominational capacity of a part of the stored multiplicand quantity to be selected in a partial multiplicand selector position of the machine carriage.

8. The combination with a multiplying machine having a movable carriage, a multiplicand storage means including a plurality of denominationally ordered, decimal, electrical read-out devices each of like construction and including a plurality of numeric data terminals and a common or column terminal connected to one of the data terminals in accordance with the numeric value of the decimal digit of that order of the multiplicand corresponding to that read-out device, and a multiplying unit including column shifter means having electrical terminals adapted to be connected to the column terminals of said read-out devices, of a carriage controlled, differentially operable, full and partial multiplicand selector unit including selectively operable control elements connected in circuit between the column terminals of each of said multiplicand storage read-out devices and the column shifter terminals of said multiplier unit and affording a selection in different carriage positions of the multiplying machine of utilizing the entire multiplicand quantity in the multiplicand storage means with said multiplying unit in one of said carriage positions and different parts of the same multiplicand quantity stored in the same multiplicand storage means with said multiplying unit in different positions of said carriage, and two groups of independently and manually presettable, multiple position, plural level, ganged switching means each connected in the column terminal circuits of two similar groups of different successive denominationally ordered storage devices for varying the denominational capacity of different parts of the stored multiplicand quantity to be selected in partial multiplicand selector positions of the machine carriage.

9. The combination with an electro-mechanical multiplying machine having a movable carriage, a keyboard for indexing of a multiplier quantity and a multiplicand quantity in different positions of the carriage, storage and totalizer registers, a plurality of differentially positionable data racks cooperable with said keyboard and said registers, a multiplier storage means and multiplicand storage means selectively settable by and in accordance with the differential positions of said data racks in different positions of the carriage, each of said storage means including a plurality of denominationally ordered decimal storage, electrical read-out devices each of like construction and including a plurality of numeric data terminals and a common or column terminal connected to one of the data terminals in accordance with the numeric value of the decimal digit of that order of a stored quantity corresponding to that order of read-out device, and a partial product multiplying unit including left and right hand function tables having electrical terminals coupled to the numeric data terminals of said multiplier and multiplicand storage devices and a column shifter section having electrical input terminals normally connected to the column terminals of said multiplicand storage read-out devices and electrical output terminals, and a product accumulator having electrical terminals connected to the electrical output terminals of the column shifter section of the multiplying unit and cooperable with the data racks to position the racks in accordance with the computed product, of a carriage controlled, differentially operable, full and partial multiplicand selector unit including control elements connected in circuit between the column terminals of each of multiplicand storage unit read-out devices and the input terminals of said column shifter section of said multiplier unit and affording a selection in different carriage positions of utilizing the entire multiplicand quantity stored in all of the read-out devices of the multiplicand storage means with said multiplying unit in one of said carriage positions and different parts of the multiplicand quantity stored in the same multiplicand storage means with said multiplying unit in different positions of said movable carriage, and manually presettable, multiple position, plural level switching means each connected in the column terminal circuits of a group of successive denominationally ordered multiplicand storage devices for varying the denominational capacity of a part of the stored multiplicand quantity to be selected in a partial multiplicand selector position of the machine carriage.

References Cited in the file of this patent

UNITED STATES PATENTS

| | | |
|---|---|---|
| 2,090,103 | Bryce | Aug. 17, 1937 |
| 2,222,373 | Rauh | Nov. 19, 1940 |
| 2,836,355 | Banik et al. | May 27, 1958 |
| 2,864,554 | Rolph et al. | Dec. 16, 1958 |
| 2,895,121 | Bliss | July 14, 1959 |